Patented Dec. 6, 1932

1,890,086

UNITED STATES PATENT OFFICE

IRVIN W. HUMPHREY, OF WILMINGTON, DELAWARE, ASSIGNOR TO HERCULES POWDER COMPANY, OF WILMINGTON, DELAWARE, A CORPORATION OF DELAWARE

METHOD OF REFINING ROSIN

No Drawing. Application filed February 28, 1930, Serial No. 432,253. Renewed May 28, 1931.

My invention relates to a method of refining rosin, such as wood rosin and gum rosin, and more particularly relates to removal from wood or gum rosin of color bodies. As is well known, both wood and gum rosin contain color bodies which render the rosin undesirable for use in connection with the production of various products where a light colored product is desired. Gum rosin, which, as is well known, is obtained from living pine trees, contains color bodies which give to the rosin and products in which it may be used a more or less dark color, and wood rosin, which, as is well known, is obtained, for example, by the extraction of pine stump wood with a suitable solvent after removal of pine oil and turpentine by distillation, contains color bodies which are observable as in the case of gum rosin, and also certain color bodies which are not observable in the rosin as such but which darken, for example, when the rosin is subjected to oxygen, as present in the air, in the presence of an alkali, as when the rosin is used for the production of soap. The non-observable or latent color bodies present in wood rosin are also to a limited extent found in certain low grades of gum rosin.

The color bodies present in both wood and gum rosin and the latent color bodies present in wood rosin and low grades of gum rosin are deleterious, as has been indicated, since they act to darken products in which the rosin may be used, as soaps, varnishes, sizes, and the like. Heretofore the observable color bodies have been, to a substantial degree, removed from both wood and gum rosin. However, except by the practice of certain processes, the removal of latent color bodies from wood rosin and, where present, from gum rosin, has not been effected, with the result that wood rosin and gum rosin containing such latent color bodies have been unusable in connection with the production of products where lightness of color is essential, and especially where such products involve an alkali in addition to rosin, since, as has been indicated, the latent color bodies will darken when subjected to oxygen in the presence of an alkali.

Now, it is the object of my invention to provide a process for the refining of rosin by the removal of color bodies therefrom, both observable and latent, with the production of a rosin light in color and, in the case of wood rosin and gum rosin containing latent color bodies, largely free from latent color bodies and available for use in the production of products of light color, such as soaps, limed varnishes, sizes, etc., etc.

In accordance with my invention I effect the removal from rosin (either wood or gum rosin) of observable color bodies and of latent color bodies where present, by treatment of the rosin with an ester having the capacity for selectively dissolving color bodies in the rosin and which is immiscible, or capable of being rendered immiscible with suitable solvents for rosin.

In carrying out the process in accordance with my invention the rosin is treated in solution in a solvent therefor and I may use any ester having the indicated capacity for selectively dissolving color bodies in the rosin and which is immiscible, or capable of immiscibility with such solvent as is used for the rosin, that is either normally immiscible or capable of being rendered immiscible with the solvent, for example, by temperature control.

In carrying my invention into practice rosin, in solution in a suitable solvent therefor, is subjected to treatment with a suitable ester and the ester and color bodies of the rosin dissolved thereby separated from the rosin. In the treatment of the rosin in solution in a solvent the ester is agitated, or otherwise thoroughly mixed, as by heating, with the rosin solution to afford intimate contact between the ester and rosin solution, and after separation of the ester and color bodies of the rosin dissolved thereby from the rosin solution, as by gravity, the refined rosin may be recovered from the rosin solution by, for example, evaporation off of the solvent.

In carrying my invention into practice, I may use, for example, esters of the lower aliphatic monohydric alcohols, as methyl, ethyl and n-propyl alcohols, or of polyhydric alcohols, as ethylene glycol or glycerol, of phenols, as ordinary phenol, resorcinal, etc., or of alcohols containing a cyclic group, as furfuryl, benzyl, or the like. Further, I may use esters derived from aliphatic monocarboxylic acids, as formic, acetic, glycollic, or the like acids, or from polycarboxylic acids, as oxalic, malonic, tartaric, or the like acids, or from acids containing a cyclic group, as phthalic, furoic, or benzoic, or the like acids. For example, I may use the following esters: ethyl formate, methyl acetate, methyl formate, methyl orthonitrobenzoate, methyl furoate, allyl formate, monoacetin, diacetin, triacetin, ethylene glycol monoacetate, ethylene glycol diacetate, glycerol diacetate chlorohydrin, resorcinol monoacetate, resorcinal diacetate, phenyl acetate, furfuryl acetate and ethylidine diacetate, n-propyl furoate, ethyl glycollate, methyl citrate, ethyl tartrate, ethyl malonate, methyl maleate, dimethyl phthalate, benzyl formate, monobutyrin, ethyl carbamate, methyl lactate, diethyl oxalate, methyl adipate, hydroxyhdroquinone triacetate, methyl chlor carbonate, propylene glycol monacetate, hydroquinone diacetate, catechol monacetate, guaiacyl acetate, methyl glutarate, ethyl oxanilate, benzyl acetate, diethyl glutaconate, ethyl lactate, diethyl phthalate, ethyl anisate, methyl salicylate, methyl cinnamate, methyl mandelate, methyl acrylate, ethyl oxamate, methyl succinate, ethyl propiolate, methyl acrylate, and ethyl malate.

As the solvent for the rosin where the rosin is treated in solution, for example, gasoline, petroleum ether, or other light petroleum distillate, turpentine, dipentene, pinene, or the like, may be used, and the rosin may be treated, if desired, as present in "drop liquor". The solvent, it will be understood, acts as a carrier for dispersing the rosin. Hence, it will be understood that any solvent for the rosin which will not negative the selective solvent action of the ester and with which the ester is substantially immisible, or capable of being rendered immiscible, may be used in the carrying out of my process.

In carrying my invention into practice, for example, 500 parts of a 14% solution of ordinary wood rosin in gasoline may be agitated with 100 parts of monacetin and the mixture permitted to settle at a temperature desirably of about −10° C. The mixture on settlement will yield an upper layer of around 485 g. involving substantially gasoline and refined rosin, which on separation from a lower layer involving essentially monacetin and color bodies of the rosin dissolved therein, will yield 56 parts of refined rosin, grading H in color. The refined rosin may be readily recovered from the gasoline-rosin solution by, for example, evaporating off the gasoline. By similar treatment, using, for example, diacetin in place of monacetin, 57 parts of rosin grading H+ in color may be obtained, while with the use of triacetin 55 parts of rosin grading H+ may be obtained.

As a further illustration, 500 parts of a 14% solution of wood rosin in gasoline may be agitated with 100 parts of ethylene glycol monoacetate, separation of the monoacetate and color bodies dissolved from the gasoline-rosin solution being effected, for example, by settlement at a temperature desirably of about −8° C. Settlement of the mixture will give an upper layer of about 480 g. comprising a substantially gasoline-rosin solution and from which may be recovered by evaporation of the gasoline 52 parts of refined rosin grading I in color. Similar treatment with ethylene glycol diacetate substituted for ethylene glycol monoacetate will yield about 55 parts of refined rosin grading I− in color.

As a further example, 300 parts of the solution of ordinary wood rosin in gasoline may be agitated with 25 parts of resorcinol monoacetate and the mixture permitted to settle at desirably a temperature of about −5° C. On settlement an upper layer comprising essentially gasoline-rosin solution will be obtained and from which about 33 parts of refined rosin grading K in color may be recovered on evaporation of the gasoline. Similar procedure with, however, the replacement of the monoacetate with diacetate will yield 35 parts of refined rosin grading H in color.

As a further illustration, 50 parts of the solution of wood rosin in gasoline may be agitated with 25 parts of furfuryl acetate and permitted to settle at a temperature of desirably about −10° C. On settlement an upper layer comprising essentially gasoline-rosin solution will be formed and about 5 parts of refined rosin grading G in color may be recovered by evaporation of the gasoline. Similar treatment with phenyl acetate will yield a refined rosin grading I in color.

As a further illustration, for example, 60 parts of the solution of ordinary wood rosin in gasoline may be agitated with 9 parts of methyl furoate and the mixture permitted to settle at a temperature desirably of about −15° C. Settlement will produce a layer comprising substantially gasoline-rosin solution from which 6 parts of refined rosin grading I in color may be recovered by evaporation off of the gasoline.

As a further illustration 1 part by volume of solution of rosin in gasoline may be agitated with one part by volume of allyl formate and the mixture permitted to separate at a temperature desirably of −50° C. After separation a layer comprising essentially gasoline-rosin solution will be formed and from which refined rosin grading G in color may be recovered by evaporation of the gasoline.

As a further illustration, for example, 500 grams of pinene solution of wood rosin (14% rosin content) is shaken with 250 parts of monacetin and permitted to separate at about −15° C. The upper layer, about 210 grams, on separation off of the pinene, will yield 61 parts of refined rosin grading about G− in color.

As a further illustration, for example, 100 parts of a gasoline solution of wood rosin (14% rosin) is mixed with 27 parts of benzyl formate, cooled and separated at −40° C.; the upper layer will yield 9 parts of I grade rosin. Further, 50 parts of the gasoline-rosin solution and 29 parts of methyl lactate are shaken and separated at −10° C.; the upper layer will yield 5 parts of I grade rosin. Further, 50 parts of the gasoline-rosin solution and 25 parts of methyl malonate are agitated and separated at −10° C. will yield an upper layer of 48 parts from which 6 parts of H grade rosin may be recovered; and again 500 parts of the gasoline-rosin solution are agitated with 300 parts of diethyl phthalate, cooled and separated at about −10° C. and will yield an upper layer from which on evaporation of the solvent 37 parts of I grade rosin will be obtained.

It will be understood that in carrying out the method in accordance with this invention in the case of certain esters it may be necessary to cool to a low temperature, say as low as −50° C. to obtain separation of the ester from the rosin solution, and in other cases for desired contact between the ester and rosin solution, it may be necessary to heat the rosin solution and the ester, and it may be necessary to heat certain esters to render them liquid, or to dissolve certain esters, as resorcinol dibenzoate, ethyl furoate, etc. in a suitable solvent, as ethylene chlorohydrin, furfural, etc., which is immiscible, or capable of being rendered immiscible with the rosin solution. Further, it will be understood that treatment of the rosin may be effected by the use of several portions of the ester used instead of treatment with only one portion, or several treatments may be given.

It will now be understood that the method in accordance with my invention involves broadly the refining of rosin, more particularly by the removal of color bodies observable and/or latent, from rosin, which may be either wood or gum rosin, by treatment of the rosin in solution in a solvent therefor, with an ester having a capacity for selectively extracting such color bodies from the rosin and having a capacity for or capable of being rendered immiscible with the rosin-solvent used for forming the rosin solution treated. It will also be understood that in accordance with my invention, I contemplate the use of mixtures of esters.

It will be understood that in specifying certain solvents for the rosin and specifying certain esters that I do not intend such a specification to limit the scope of my invention, since it will be understood that I contemplate any solvent other than those specified which may be operably equivalent therefor in the carrying out of my process and that I contemplate the use of any ester other than those specified which has a capacity for selectively dissolving the color bodies in the rosin and which is immiscible or capable of being rendered immiscible with the solvent used for forming the rosin solution treated.

What I claim and desire to protect by Letters Patent is:

1. The step in the method of refining rosin by the removal of color bodies therefrom which includes subjecting rosin in solution in a suitable solvent to treatment with an organic ester having a capacity for selectively dissolving color bodies in the rosin and capable of immiscibility with the rosin solution.

2. The step in the method of refining rosin by the removal of color bodies therefrom which includes subjecting rosin in solution to treatment with an organic ester of an aliphatic alcohol capable of selectively dissolving color bodies in the rosin.

3. The method of refining rosin by the removal of color bodies therefrom which includes subjecting rosin in solution in a suitable solvent therefor to treatment with an organic ester, having a capacity for selectively dissolving color bodies in the rosin and which is capable of immiscibility with the rosin solvent solution, separating the ester and color bodies dissolved thereby from the rosin-solvent solution and recovering refined rosin from the rosin-solvent solution.

4. The method of refining rosin by the removal of color bodies therefrom which includes subjecting rosin in solution in a solvent therefor to treatment with an organic ester capable of selectively dissolving color bodies in the rosin and containing a radical promoting immiscibility with the rosin-solvent solution, as an ethyl, methyl, formate or acetate radical, separating the ester and color bodies dissolved thereby from the rosin-solvent solution and recovering refined rosin from the rosin-solvent solution.

5. The method of refining rosin by the removal of color bodies therefrom which includes subjecting rosin in solution in gasoline to treatment with an organic ester, having a capacity for selectively dissolving color bodies in the rosin and which is capable of immiscibility with a gasoline-rosin solution, separating the ester and color bodies dissolved thereby from the rosin-gasoline solution and recovering refined rosin from the rosin-gasoline solution.

6. The method of refining rosin by the removal of color bodies therefrom which includes subjecting rosin in solution in gasoline to treatment with an organic ester capable of selectively dissolving color bodies in the rosin and containing a group promoting immiscibility, as a methyl, formate, acetate, or ethyl radical, separating the ester and color bodies dissolved thereby from the rosin-gasoline solution and recovering refined rosin from the rosin-gasoline solution.

7. The step in the method of refining rosin in solution in a suitable solvent by the removal of color bodies therefrom which includes subjecting rosin to treatment with an organic ester of ethylene glycol capable of selectively dissolving color bodies in the rosin.

8. The step in the method of refining rosin by the removal of color bodies therefrom which includes subjecting rosin in solution in a suitable solvent to treatment with an acetic acid ester of ethylene glycol.

9. The step in the method of refining rosin by the removal of color bodies therefrom which includes subjecting rosin in solution in gasoline to treatment with an organic ester of ethylene glycol capable of selectively dissolving color bodies in the rosin.

10. The step in the method of refining rosin in solution in a suitable solvent by the removal of color bodies therefrom which includes subjecting rosin to treatment with an organic acid ester of a polyhydric alcohol capable of selectively dissolving color bodies in the rosin.

11. The step in the method of refining rosin by the removal of color bodies therefrom which includes subjecting rosin in solution in a suitable solvent to treatment with an organic acid ester of a monohydric alcohol capable of selectively dissolving color bodies in the rosin.

12. The step in the method of refining rosin by the removal of color bodies therefrom which includes subjecting rosin in solution in gasoline to treatment with an organic acid ester of polyhydric alcohol capable of selectively dissolving color bodies in the rosin.

13. The step in the method of refining rosin in solution in a suitable solvent by the removal of color bodies therefrom which includes subjecting rosin to treatment with an organic glycol ester.

14. The step in the method of refining rosin by the removal of color bodies therefrom which includes subjecting rosin in solution in a suitable solvent to treatment with an organic glycol ester capable of selectively dissolving color bodies in the rosin.

15. The step in the method of refining rosin by the removal of color bodies therefrom which includes subjecting rosin in solution in gasoline to treatment with an organic glycol ester.

16. The step in the method of refining rosin in solution in a suitable solvent by the removal of color bodies therefrom which includes subjecting rosin to treatment with an acetic acid ester of a polyhydric alcohol.

17. The step in the method of refining rosin by the removal of color bodies therefrom which includes subjecting rosin in solution in a suitable solvent to treatment with an acetic acid ester of a polyhydric alcohol.

18. The step in the method of refining rosin by the removal of color bodies therefrom which includes subjecting rosin in solution in gasoline to treatment with an acetic acid ester of a polyhydric alcohol.

19. The step in the method of refining rosin by the removal of color bodies therefrom which includes subjecting rosin in solution in an organic solvent to treatment with an organic ester having a capacity for selectively dissolving color bodies in the rosin and capable of immiscibility with the rosin solution.

20. The step in the method of refining rosin in solution in a suitable solvent by the removal of color bodies therefrom which includes subjecting rosin to treatment with an organic acid ester of a lower aliphatic alcohol capable of selectively dissolving color bodies in the rosin.

21. The step in the method of refining rosin in solution in a suitable solvent by the removal of color bodies therefrom which includes subjecting rosin to treatment with an organic acid ester of a lower aliphatic alcohol capable of selectively dissolving color bodies in the rosin and containing not more than three carbon atoms.

22. The step in the method of refining rosin in solution in a suitable solvent by the removal of color bodies therefrom which includes subjecting rosin to treatment with an ester derived from an organic monocarboxylic acid capable of selectively dissolving color bodies in the rosin.

23. The step in the method of refining rosin in solution in a suitable solvent by the removal of color bodies therefrom which includes subjecting rosin to treatment with an ester derived from acetic acid capable of selectively dissolving color bodies in the rosin.

In testimony of which invention, I have hereunto set my hand, at Kenvil, N. J., on this 21st day of February, 1930.

IRVIN W. HUMPHREY.